United States Patent
Onodera et al.

(12)

(10) Patent No.: US 11,134,089 B2
(45) Date of Patent: Sep. 28, 2021

(54) MALWARE ANALYSIS METHOD, MALWARE ANALYSIS DEVICE, AND MALWARE ANALYSIS SYSTEM

(71) Applicant: NEC Corporation, Tokyo (JP)

(72) Inventors: Hisato Onodera, Tokyo (JP); Yoshiya Kizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 490 days.

(21) Appl. No.: 15/928,294

(22) Filed: Mar. 22, 2018

(65) Prior Publication Data

US 2018/0288076 A1 Oct. 4, 2018

(30) Foreign Application Priority Data

Mar. 30, 2017 (JP) .............................. JP2017-066566

(51) Int. Cl.
| | | |
|---|---|---|
| *H04L 29/06* | (2006.01) | |
| *G06F 16/22* | (2019.01) | |
| *G06F 21/55* | (2013.01) | |
| *G06F 21/56* | (2013.01) | |

(52) U.S. Cl.
CPC .......... *H04L 63/1416* (2013.01); *G06F 16/22* (2019.01); *G06F 21/554* (2013.01); *G06F 21/562* (2013.01); *G06F 21/566* (2013.01); *H04L 63/145* (2013.01); *G06F 2221/033* (2013.01)

(58) Field of Classification Search
CPC ... H04L 63/1416; H04L 63/14; H04L 63/145; H04L 29/06; G06F 21/562; G06F 21/566; G06F 21/554; G06F 16/22; G06F 2221/033; G06F 17/30
See application file for complete search history.

(56) References Cited

U.S. PATENT DOCUMENTS

| | | |
|---|---|---|
| 9,241,010 B1 | 1/2016 | Bennett et al. |
| 10,044,675 B1 * | 8/2018 | Ettema ................ G06F 9/45533 |
| 10,289,844 B2 * | 5/2019 | Charters ............... G06F 21/568 |

(Continued)

FOREIGN PATENT DOCUMENTS

| | | |
|---|---|---|
| JP | 2011-154727 A | 8/2011 |
| JP | 2013-114637 A | 6/2013 |

(Continued)

OTHER PUBLICATIONS

Singapore Office Action for SG Application No. 10201802586V dated Jul. 17, 2018.

(Continued)

*Primary Examiner* — Quazi Farooqui

(57) ABSTRACT

A malware analysis device 10 includes: a dynamic analysis unit 11 which performs dynamic analysis of malware; a communication determination unit 12 which determines whether communication by the malware occurs when the dynamic analysis unit 11 performs dynamic analysis; a static analysis requesting unit 13 which suspends communication when the communication determination unit 12 determines that the communication by the malware occurs to present a request to perform static analysis; and a setting changing unit 14 which sets a device as a communication destination of the malware to make a response obtained by the static analysis as being expected by the malware.

6 Claims, 7 Drawing Sheets

(56) References Cited

U.S. PATENT DOCUMENTS

| | | | |
|---|---|---|---|
| 2014/0143869 A1* | 5/2014 | Pereira | G06F 21/566 |
| | | | 726/23 |
| 2016/0234068 A1* | 8/2016 | Dolganow | H04L 47/2483 |
| 2017/0206356 A1 | 7/2017 | Iwamura et al. | |
| 2017/0288854 A1 | 10/2017 | Yamane et al. | |
| 2017/0359376 A1* | 12/2017 | Evron | H04L 63/1491 |
| 2020/0067861 A1* | 2/2020 | Leddy | H04L 51/12 |

FOREIGN PATENT DOCUMENTS

| | | | |
|---|---|---|---|
| JP | 5389855 B2 | 1/2014 |
| JP | 6018346 B2 | 11/2016 |
| WO | 2016/047111 A1 | 3/2016 |

OTHER PUBLICATIONS

Japanese Office Action for JP Application No. 2017-066566 dated Nov. 24, 2020 with English Translation.

\* cited by examiner

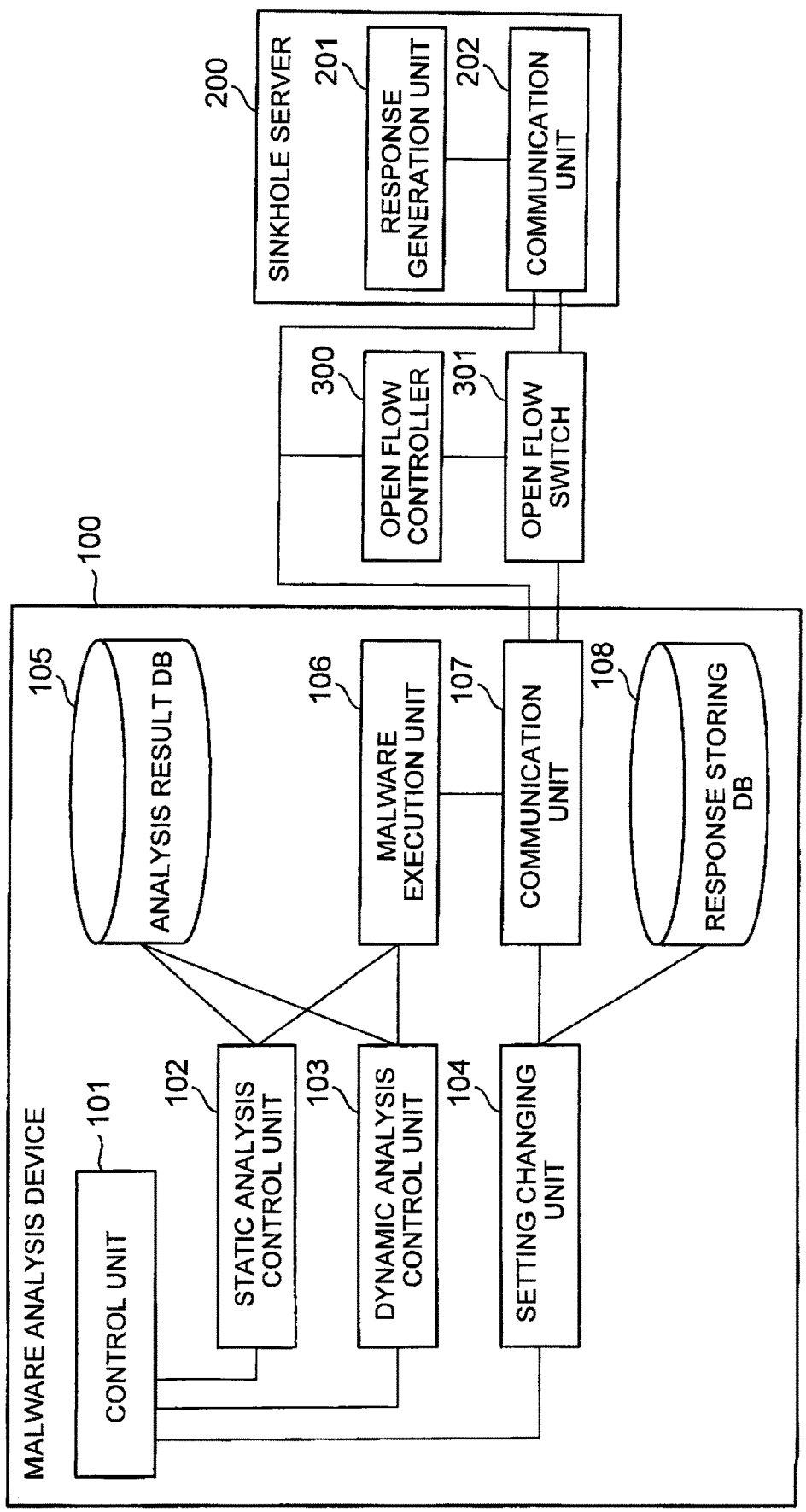

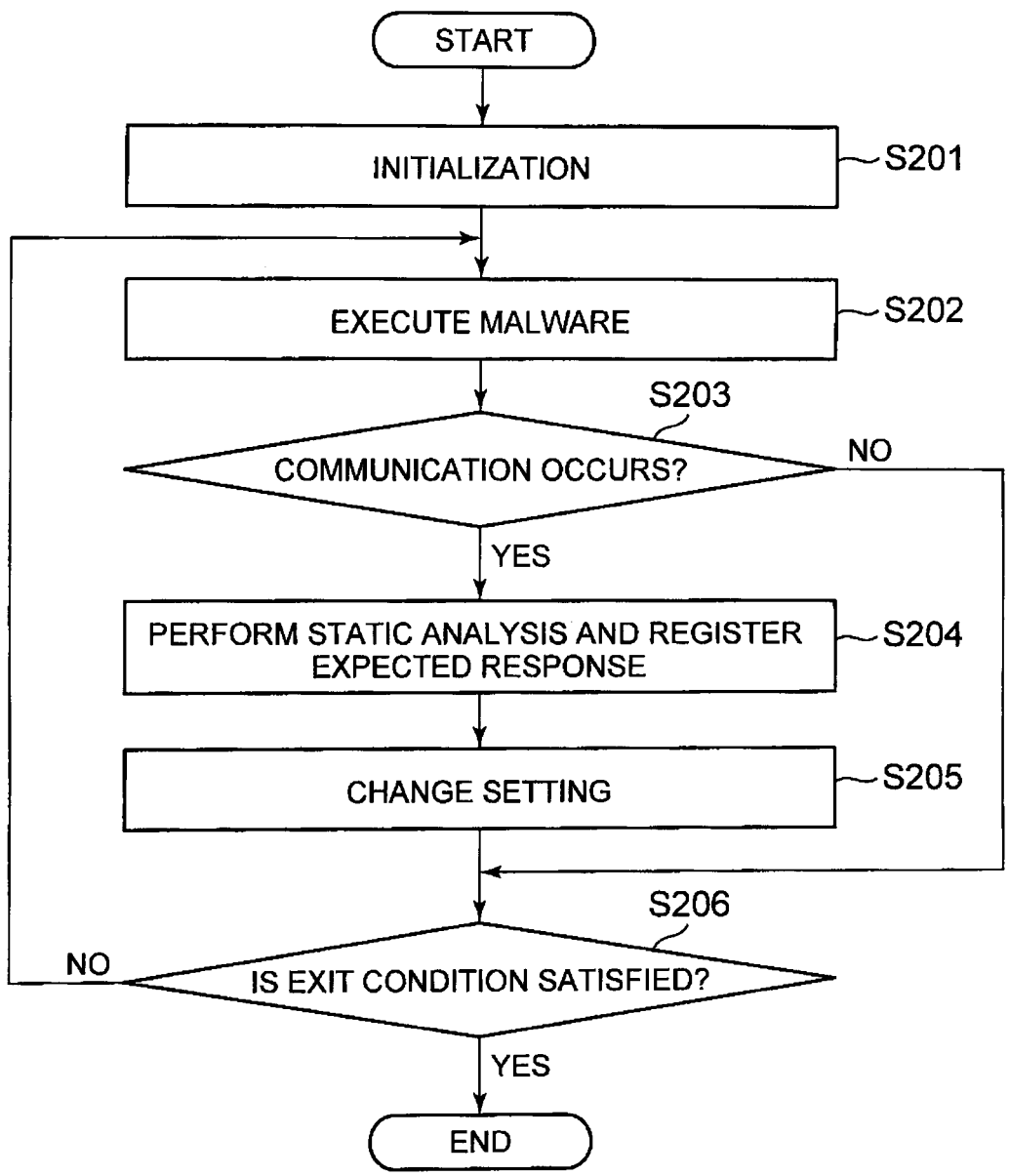

FIG. 3

| API | ARGUMENT | FLOW INFORMATION | EXPECTED RESPONSE | SETTING METHOD |
|---|---|---|---|---|
| GetHostAddresses( ) | malware.example.com | SOURCE/DESTINATION MAC ADDRESSES<br>SOURCE/DESTINATION IP ADDRESSES<br>SOURCE/DESTINATION PORT NUMBERS<br>· · · | A 10.20.30.40 | ADD ENTRY OF DNS SERVER |
| GetResponse( ) | malicious.site.net | SOURCE/DESTINATION MAC ADDRESSES<br>SOURCE/DESTINATION IP ADDRESSES<br>SOURCE/DESTINATION PORT NUMBERS | HTTP/1.1 200 OK<br>Server: · · ·<br>Date: · · ·<br><br>abcdef | CREATE CONTENT OF WEB SERVER |

MALWARE ANALYSIS METHOD, MALWARE ANALYSIS DEVICE, AND MALWARE ANALYSIS SYSTEM

CROSS-REFERENCE TO RELATED APPLICATION

This application is based upon and claims the benefit of priority from the prior Japanese Patent Application No. 2017-066566, filed Mar. 30, 2017, the entire contents of which are incorporated herein by reference.

BACKGROUND OF THE INVENTION

Field of the Invention

The present invention relates to a malware analysis method, a malware analysis device, and a malware analysis system, capable of analyzing malware easily.

Description of the Related Art

There are increasing malicious programs (malware), such as computer viruses or spyware, and bots, which bring threats such as information leakage and destruction of data.

In such a situation, there is a technique for executing malware actually in an environment capable of running the malware safely to observe the behavior of the malware in order to analyze the malware.

There is malware which infects a computer (e.g., an information terminal such as a personal computer) to connect the infected computer to a C&C (Command & Control) server. The C&C server sends commands to the malware to operate the computer by remote control.

When such malware is dynamically analyzed, the computer infected with the malware is made communicable with the C&C server. However, when the computer communicates with the C&C server, there is a possibility that the computer will suffer damage. Further, when the C&C server no longer exists, the dynamic analysis cannot be performed.

Patent Literature 1 discloses a technique for examining what kind of communication malware performs and what impact the malware has on internal resources of a computer.

An analysis system disclosed in Patent Literature 1 determines a communication protocol when the malware performs communication. Then, a pseudo response (dummy response) from a server predetermined according to the communication protocol is transmitted to the malware. Thus, the malware is dynamically analyzed even in such a situation that actual communication with the C&C server is not performed.

[Patent Literature 1] Japanese Patent No. 5389855

SUMMARY OF THE INVENTION

However, when the communication protocol cannot be determined, or when the pseudo response from the server response cannot be predefined, the analysis system disclosed in Patent Literature 1 cannot analyze the malware.

It is an object of the present invention to enable malware to be analyzed more easily.

A preferred aspect of a malware analysis method includes: determining whether communication by malware occurs when the malware is dynamically analyzed; suspending communication when the communication by the malware occurs to present a request to perform static analysis; and setting a device as a communication destination of the malware to make a response obtained by the static analysis as being expected by the malware.

A preferred aspect of a malware analysis device includes: a dynamic analysis unit which performs dynamic analysis of malware; a communication determination unit which determines whether communication by the malware occurs when the dynamic analysis unit performs dynamic analysis; a static analysis requesting unit which suspends communication when the communication determination unit determines that the communication by the malware occurs to present a request to perform static analysis; and a setting changing unit which sets a device as a communication destination of the malware to make a response obtained by the static analysis as being expected by the malware.

A preferred aspect of a malware analysis system includes a malware analysis device and a pseudo response server which transmits, to malware, a pseudo response as a response expected by the malware, wherein the malware analysis device includes: a dynamic analysis unit which performs dynamic analysis of the malware; a communication determination unit which determines whether communication by the malware occurs when the dynamic analysis unit performs dynamic analysis; a static analysis requesting unit which suspends communication when the communication determination unit determines that the communication by the malware occurs to present a request to perform static analysis; and a setting changing unit which sets the pseudo response server to make a response obtained by the static analysis as being expected by the malware.

A preferred aspect of a malware analysis program causes a computer to execute: a process of determining whether communication by malware occurs when the malware is dynamically analyzed; a process of suspending communication when the communication by the malware occurs to present a request to perform static analysis; and a process of setting a device as a communication destination of the malware to make a response obtained by the static analysis as being expected by the malware.

According to the present invention, malware can be analyzed more easily.

BRIEF DESCRIPTION OF THE DRAWINGS

FIG. 1 It depicts a block diagram illustrating an exemplary embodiment of a malware analysis system including a malware analysis device.

FIG. 2 It depicts a flowchart illustrating an operation example of the malware analysis device.

FIG. 3 It depicts a table for describing an example of information stored in a storing database.

DESCRIPTION OF THE PREFERRED EMBODIMENTS

Figure 4:
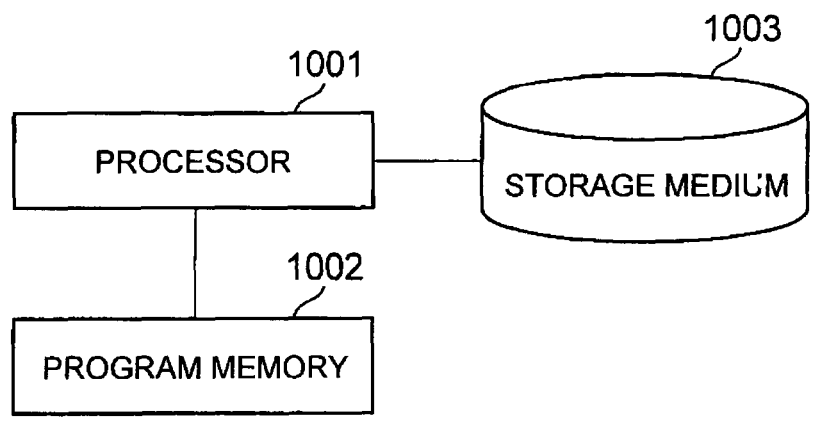
FIG. 4 It depicts a block diagram illustrating a configuration example of an information processing system in which the functions of a malware analysis device can be implemented.

An exemplary embodiment of the present invention will be described with reference to the accompanying drawings.

FIG. 1 is a block diagram illustrating an exemplary embodiment of a malware analysis system including a malware analysis device. In the example of FIG. 1, a malware analysis device 100 in the malware analysis system is connected to a sinkhole server 200 through an open flow switch 301. The sinkhole server 200 is used in a path for communication performed by malware.

In the following description, "malware performs communication" actually means that resources (a communication interface, and the like, which are typified by a communication unit 107 in FIG. 1) of a device in which the malware exists perform communication according to the malware.

The malware analysis device 100 is also connected directly to the sinkhole server 200 and the open flow controller 300. The reason for being directly connected is that the malware analysis device 100 controls the sinkhole server 200 and the open flow controller 300.

The open flow controller 300 is to control the open flow switch 301.

The malware analysis device 100 includes a control unit 101, a static analysis control unit 102, a dynamic analysis control unit 103, a setting changing unit 104, an analysis result database (DB) 105, a malware execution unit 106, a communication unit 107, and a response storing database (DB) 108.

The control unit 101 controls each of the functions of the malware analysis device 100. The static analysis control unit 102 performs control for static analysis of malware. The dynamic analysis control unit 103 performs control of dynamic analysis of malware. The setting changing unit 104 changes the settings of the sinkhole server 200 and the open flow controller 300.

The analysis result database 105 stores the analysis results of malware. The malware execution unit 106 executes malware to analyze the malware. The communication unit 107 performs communication with the sinkhole server 200, the open flow controller 300, and the open flow switch 301. The response storing database 108 stores a response expected by malware when the malware performs communication, and a setting method therefore.

When taking, as an example, a case where the name resolution of a C&C server is performed, the response expected by malware is an IP address of the C&C server, a web access response to check the Internet connection, a command from the C&C server to run the malware, or the like.

The sinkhole server 200 includes a response generation unit 201 which returns an expected response when the malware performs communication, and a communication unit 202 which performs communication. In this specification, the sinkhole server 200 is set as a server configured to absorb the traffic of malware in order to analyze the malware. The sinkhole server 200 supplies, to malware, a response expected by the malware (a pseudo response in fact) on behalf of the C&C server, for example.

Next, operation of the malware analysis device 100 will be described. FIG. 2 is a flowchart illustrating an operation example of the malware analysis device 100.

In the malware analysis device 100, initialization processing is first performed (step S201).

Specifically, in the initialization processing, the control unit 101 instructs the malware execution unit 106 to prepare an environment appropriate for the malware to be analyzed through the dynamic analysis control unit 103. In preparation for executing the malware, the malware execution unit 106 configures the settings of a CPU (Central Processing Unit), a memory and a disk, an OS (Operating System) and an application, and the like, required to run the malware to be analyzed.

Further, the control unit 101 sends the setting changing unit 104 an initialization instruction. The setting changing unit 104 that received the initialization instruction instructs, through the communication unit 107, the sinkhole server 200 and the open flow controller 300 to perform initialization. The sinkhole server 200 performs initialization processing in response to the instruction such as to clear the response generation. The open flow controller 300 performs processing to clear a flow table of the open flow switch 301 in response to the instruction.

Next, in step S202, the malware execution unit 106 executes the malware. The dynamic analysis control unit 103 monitors the execution status of the malware. Then, the dynamic analysis control unit 103 stores, in the analysis result database 105, information such as access of the malware to a file, process execution, API (Application Programming Interface) calling, communication destination, and the like.

In step S203, the dynamic analysis control unit 103 determines whether the malware performs communication. When it is determined that communication is performed, the procedure proceeds to step S204. When it is determined that communication is not performed, the procedure moves to step S206. For example, the dynamic analysis control unit 103 can check whether the communication unit 107 operates to determine whether the malware performs communication.

When the malware performs communication, the malware execution unit 106 transmits a packet to the open flow switch 301 through the communication unit 107. Since there is no entry of information related to the packet in the flow table, the open flow switch 301 forwards the packet to the open flow controller 300 to make an inquiry about the packet. The open flow controller 300 that received the packet holds the received packet intact when the processing step S203 is executed.

When the malware performs communication, a malware analyst makes a static analysis of the malware in step S204 to set a response expected by the malware. At this time, the malware execution unit 106 suspends the processing according to an instruction, for example, from the dynamic analysis control unit 103. Thus, the communication from the malware is suspended temporarily.

In order that the malware analyst creates an opportunity to make a static analysis of the malware, it is considered that the malware analysis device 100 performs the following processing as an example.

In other words, the dynamic analysis control unit 103 provides a display on a display unit (unillustrated in FIG. 1) of the malware analysis device 100 or a display device connected to the malware analysis device 100 through the control unit 101 to indicate that the malware does not perform communication, or a display to recommend that the static analysis should be made.

When making the static analysis, the malware analyst requests the dynamic analysis results stored in the analysis result database 105, the register of the malware execution unit 106, the state of the memory, assembly code of the malware, and the like from the control unit 101 through an input unit (unillustrated in FIG. 1) in the malware analysis device 100 or an input device connected to the malware analysis device 100. The control unit 101 transfers the input request to the static analysis control unit 102 and the malware execution unit 106.

Information as the answer to the request is output, for example, from the static analysis control unit 102 and the malware execution unit 106 to the display unit or the display device through the control unit 101. Based on the information as the answer, the malware analyst finds a response expected by the malware. The found response expected by the malware is input, for example, from the input unit or the input device to the control unit 101 or the setting changing unit 104. When the malware analysis device 100 is so configured that the response expected by the malware will be input to the control unit 101, the control unit 101 stores the response expected by the malware in the response storing database 108 through the setting changing unit 104. When the malware analysis device 100 is so configured that the response expected by the malware is input to the setting changing unit 104, the setting changing unit 104 stores the response expected by malware in the response storing database 108.

FIG. 3 is a table for describing an example of information stored in the response storing database 108.

In the example illustrated in FIG. 3, flow information to be applied to the open flow switch 301 to transfer communication to the sinkhole server 200, an expected response, and a setting method required to return the response to the sinkhole server 200 are stored for each combination of a specific API and an argument in the response storing database 108. The setting method includes a program or a script, a setting file, and the like.

In the exemplary embodiment, the API and the argument are set in the response storing database 108, but a different condition may also be set. For example, assembly code may be set instead of the API. Further, an object state, or the state of the register or the memory may be set instead of the argument. Further, the address of an instruction during execution of the malware may be set.

In step S205, the control unit 101 instructs the setting changing unit 104 to configure the settings for the sinkhole server 200 and the open flow controller 300 based on the information stored in the response storing database 108. The setting changing unit 104 executes the settings for the response generation unit 201 of the sinkhole server 200 through the communication unit 107 according to the expected response and the setting method stored in the response storing database 108. In other words, the setting changing unit 104 sets the response generation unit 201 so that the sinkhole server 200 will return the response expected by the malware.

Further, when it is detected in the processing step S203 that the malware performs communication, the setting changing unit 104 transmits, to the open flow controller 300, a flow table changing instruction together with flow information so that the communication destination of the malware will become the sinkhole server 200.

Based on the flow information received from the setting changing unit 104, the open flow controller 300 adds an entry to the flow table of the open flow switch 301 so that the communication destination of the packet put on hold in the processing step S203 will become the sinkhole server 200. Then, the open flow controller 300 forwards the packet put on hold in the processing step S203. The sinkhole server 200 that received the forwarded packet returns the response expected by the malware to the malware analysis device 100 based on the content set by the setting changing unit 104.

In step S206, the dynamic analysis control unit 103 determines whether a malware analysis exit condition is satisfied. The exit condition is, for example, that the operation of the malware is satisfied, that the execution of the malware has passed a certain length of time, or that sufficient analysis results can be obtained. When determining that the exit condition is satisfied, the dynamic analysis control unit 103 completes the analysis.

When the exit condition is not satisfied, the procedure returns to step S202. In other words, the malware execution unit 106 executes the malware, and the dynamic analysis control unit 103 continues to perform dynamic analysis. When malware communication is interrupted, the processing step S202 is executed to resume the malware communication.

As described above, in the exemplary embodiment, since static analysis is performed when the malware performs communication during malware dynamic analysis, a response expected by the malware can be set appropriately in the sinkhole server 200. In other words, the operation of the sinkhole server 200 is dynamically changed. Therefore, the dynamic analysis can be continued appropriately. As a result, the malware analysis can be performed more easily.

Further, since the response expected by the malware is stored in the response storing database 108, the need to perform static analysis can be reduced when malware similar to the malware once analyzed is analyzed. Thus, the efficiency of malware analysis is improved. Further, since the operation of the malware is not stopped, such dynamic analysis of malware as to detect that the operation is stopped to change the operation content can be performed.

In the aforementioned exemplary embodiment, the response expected by the malware is found by static analysis in the processing step S204 illustrated in FIG. 2, and set in the response storing database 108, but the response expected by the malware may be found by another method.

For example, when the control unit 101 performs initialization processing, past instances may be registered in the response storing database 108. Further, the dynamic analysis control unit 103 may generate a response pattern based on the communication protocol or the API used. Further, the dynamic analysis control unit 103 may automatically generate a response pattern, to which character strings and the like extracted as a result of static analysis are added, to use the generated response pattern in order to attempt the analysis.

Note that the malware analysis device 100 in the aforementioned exemplary embodiment can not only be configured in hardware, but also can be implemented by a computer program.

An information processing system illustrated in FIG. 4 includes a processor 1001, a program memory 1002, and a storage medium 1003 for storing data. As the storage medium 1003, for example, a magnetic storage medium such as a hard disk can be used. As the program memory 1002, a magnetic storage medium such as a ROM (Read Only Memory), a flash ROM, or a hard disk can be used.

In the information processing system illustrated in FIG. 4, a program for implementing the functions of the control unit 101, the static analysis control unit 102, the dynamic analysis control unit 103 and the setting changing unit 104 in the malware analysis device 100 illustrated in FIG. 1, and the function of the communication unit 107 except the hardware part to conduct communication are stored in the program memory 1002. The analysis result database 105 and the response storing database 108 are formed on the storage medium 1003. Then, the processor 1001 performs processing according to the program stored in the program memory 1002 to implement the functions of the malware analysis device 100 illustrated in FIG. 2.

Figure 5:
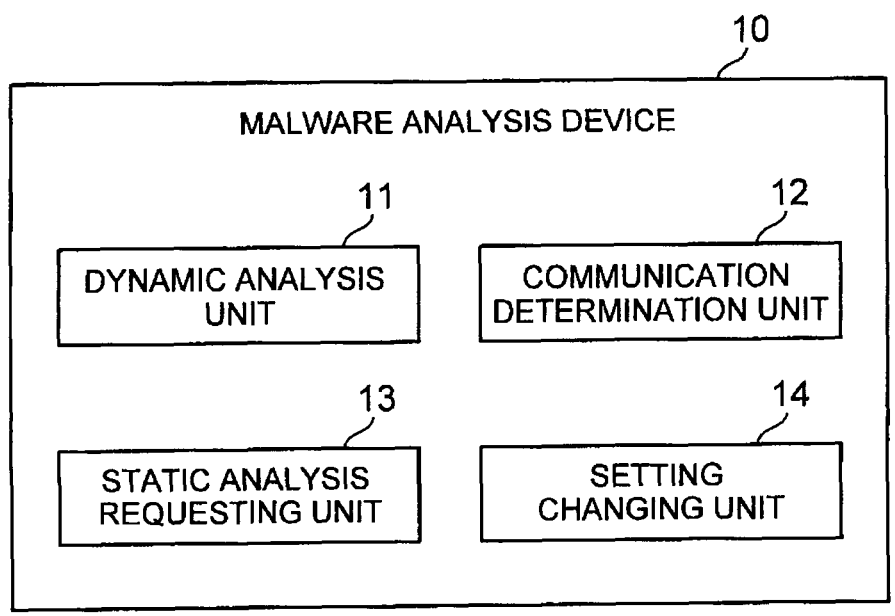
FIG. 5 It depicts a block diagram illustrating the main part of a malware analysis device.

FIG. 5 is a block diagram illustrating the main part of a malware analysis device. A malware analysis device 10 illustrated in FIG. 5 includes a dynamic analysis unit 11 (implemented by the dynamic analysis control unit 102 in the exemplary embodiment) to perform malware dynamic analysis, a communication determination unit 12 (implemented by the dynamic analysis control unit 102 in the exemplary embodiment) to determine whether malware communication occurs when the dynamic analysis unit 11 performs dynamic analysis, a static analysis requesting unit 13 (implemented by the dynamic analysis control unit 102 and the control unit 101 in the exemplary embodiment) to suspend communication when the communication determination unit 12 determines that the communication by the malware occurs to present a request to perform static analysis, and a setting changing unit 14 (implemented by the setting changing unit 104 in the exemplary embodiment) to set a device as a communication destination of the malware to make a response obtained by the static analysis as being expected by the malware.

Figure 6:
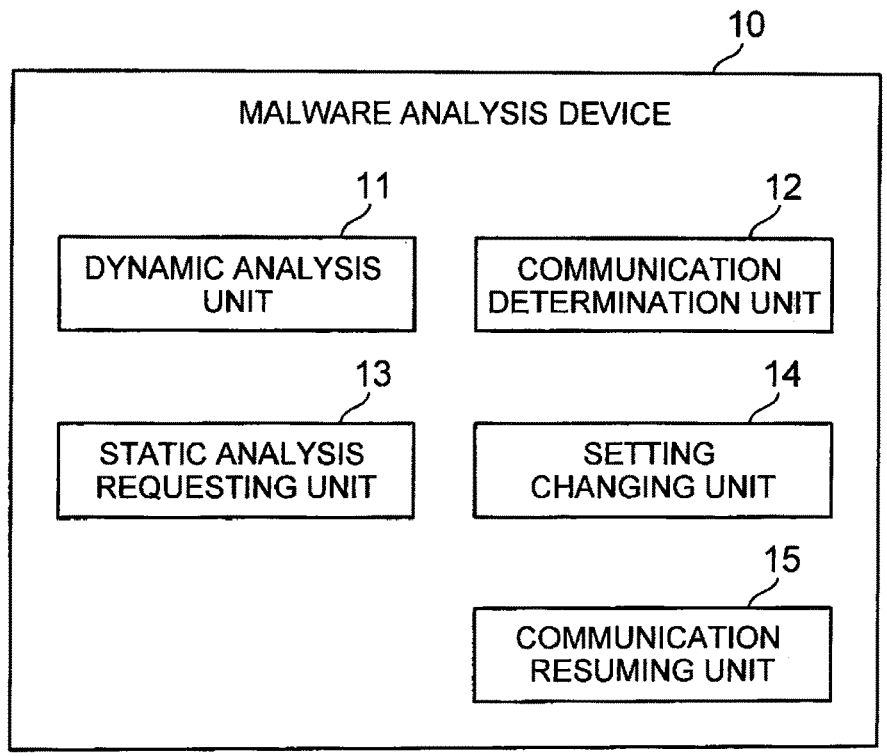
FIG. 6 It depicts a block diagram illustrating the main part of another aspect of the malware analysis device.

FIG. 6 is a block diagram illustrating the main part of another aspect of the malware analysis device. The malware analysis device 10 illustrated in FIG. 6 further includes a communication resuming unit 15 (implemented by the malware execution unit 106 and the dynamic analysis control unit 102 in the exemplary embodiment. Refer also to the case of No in step S206 of FIG. 2) to resume the malware communication after the device as the communication destination of the malware is set to make the response expected by the malware.

Figure 7:
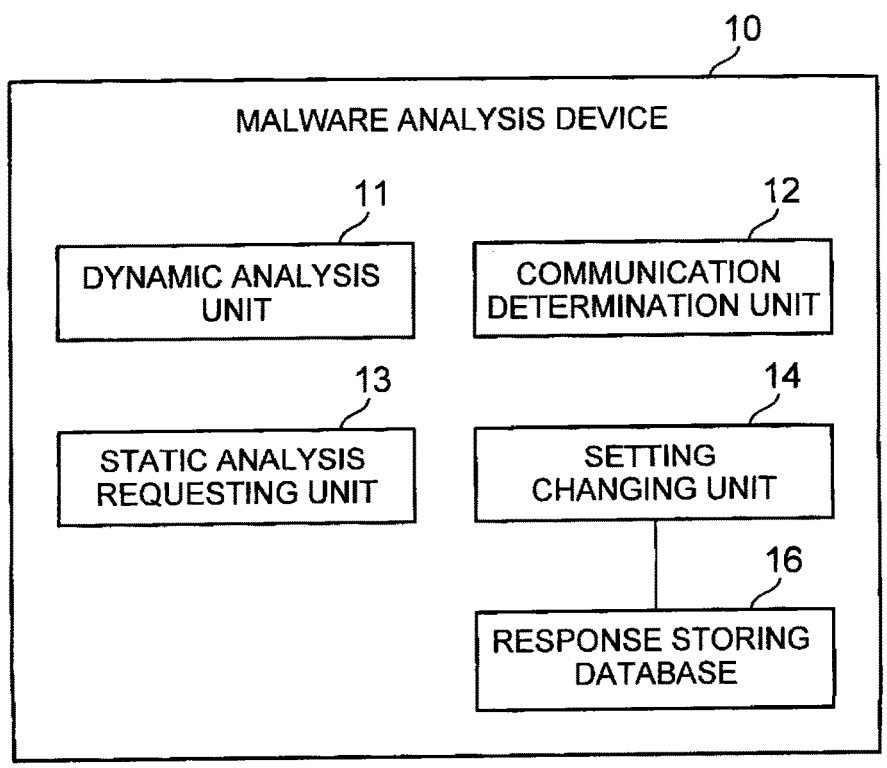
FIG. 7 It depicts a block diagram illustrating the main part of still another aspect of the malware analysis device.

FIG. 7 is a block diagram illustrating the main part of still another aspect of the malware analysis device. In the malware analysis device 10 illustrated in FIG. 7, the setting changing unit 14 stores, in a response storing database 16, the response obtained by the static analysis as being expected by the malware.

Figure 8:
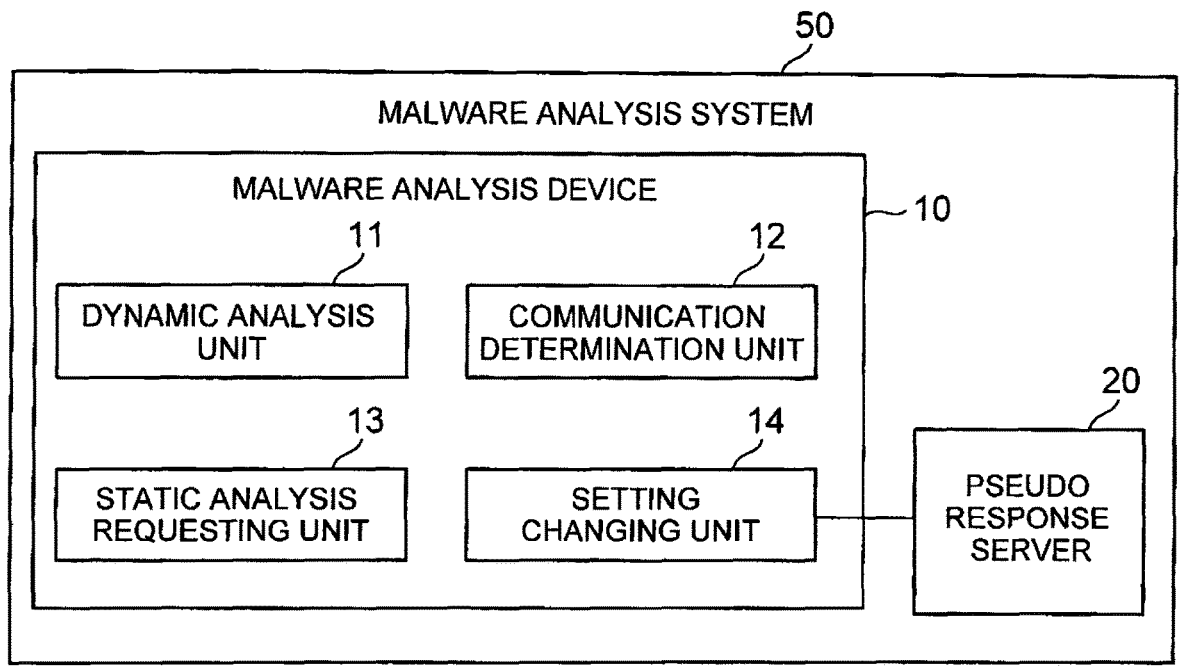
FIG. 8 It depicts a block diagram illustrating the main part of a malware analysis system.

FIG. 8 is a block diagram illustrating the main part of a malware analysis system. A malware analysis system 50 illustrated in FIG. 8 includes a malware analysis device 10, and a pseudo response server 20 (implemented by the sinkhole server 200 in the exemplary embodiment) to transmit, to the malware, a pseudo response as a response expected by the malware. The malware analysis device 10 has a dynamic analysis unit 11 which performs dynamic analysis of malware, a communication determination unit 12 which determines whether malware communication occurs when the dynamic analysis unit 11 performs the dynamic analysis, a static analysis requesting unit 13 which suspends communication when the communication determination unit 12 determines that the communication by the malware occurs to present a request to perform static analysis, and a setting changing unit 14 which sets a device as a communication destination of the malware to make a response obtained by the static analysis as being expected by the malware.

Figure 9:
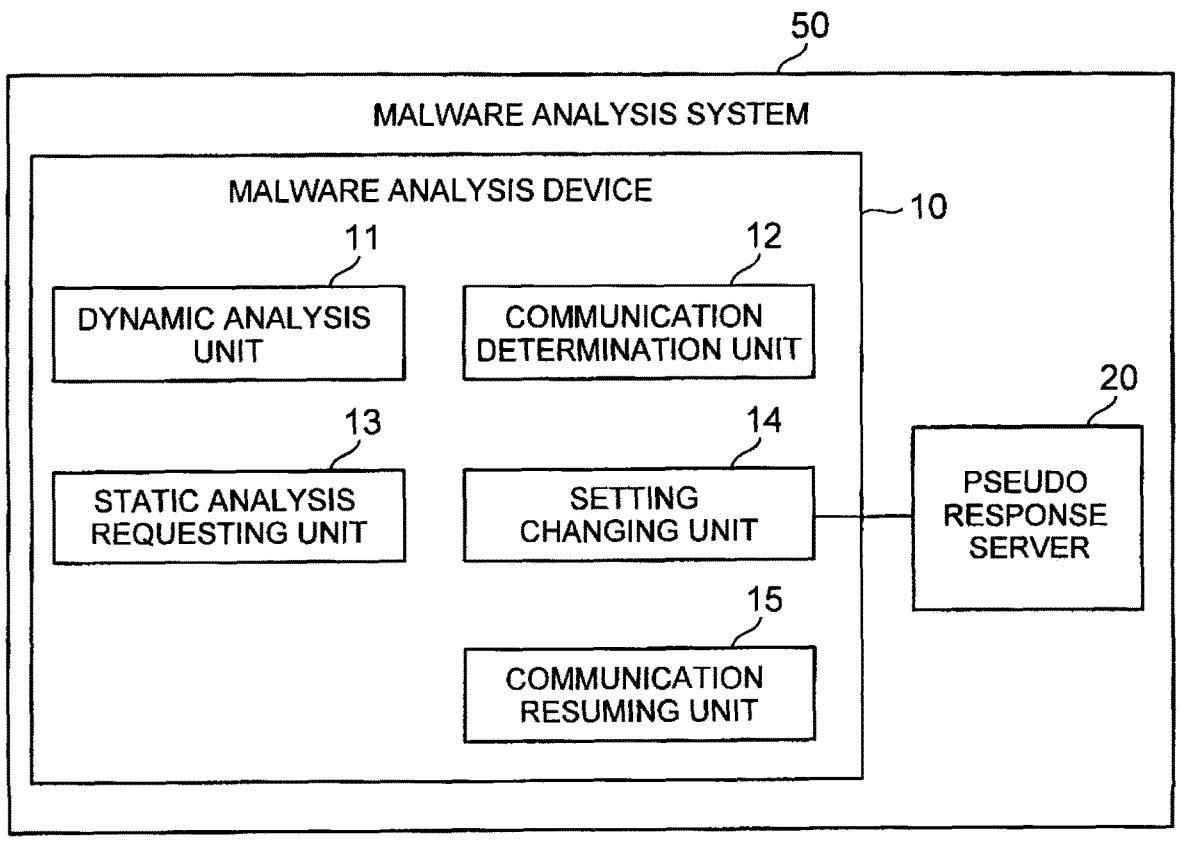
FIG. 9 It depicts a block diagram illustrating the main part of another aspect of the malware analysis system.

FIG. 9 is a block diagram illustrating the main part of another aspect of the malware analysis system. In the malware analysis system 50 illustrated in FIG. 9, the malware analysis device 10 further has a communication resuming unit 15 which resumes the communication by the malware after the pseudo response server is set to make the response expected by the malware.

Figure 10:
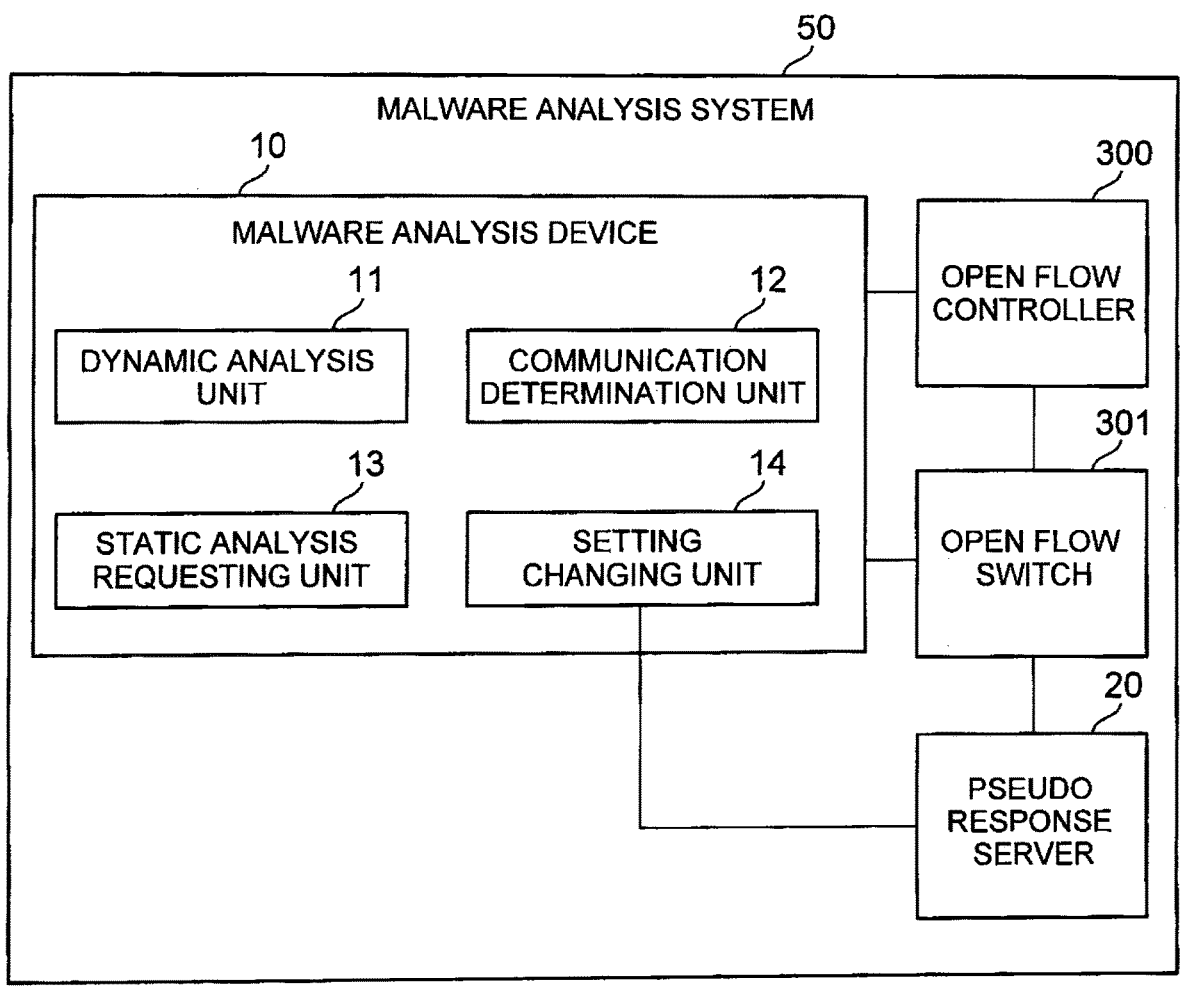
FIG. 10 It depicts a block diagram illustrating the main part of still another aspect of the malware analysis system.

FIG. 10 is a block diagram illustrating the main part of still another aspect of the malware analysis system. In the malware analysis system 50 illustrated in FIG. 10, the malware analysis device 10 is configured to perform communication with the pseudo response server 20 through an open flow switch 301 controlled by an open flow controller 300, and the setting changing unit 14 transmits, to the open flow controller 300, an instruction to update a flow table of the open flow switch 301 so that the communication destination of the malware will become the pseudo response server 20.

While the above exemplary embodiment can be described partially or wholly as the following supplementary notes, the configuration of the present invention is not limited to any of the following configurations.

(Supplementary note 1) A malware analysis program causing a computer to execute: a process of determining whether communication by malware occurs when the malware is dynamically analyzed; a process of suspending communication when the communication by the malware occurs to present a request to perform static analysis; a process of setting a device as a communication destination of the malware to make a response obtained by the static analysis as being expected by the malware; and a process of resuming the communication by the malware after the device as the communication destination of the malware is set to make the response expected by the malware.

(Supplementary note 2) The malware analysis program according to Supplementary note 1, causing the computer to further execute a process of storing, in a response storing database, the response obtained by the static analysis as being expected by malware.

(Supplementary note 3) A non-transitory recording medium storing a malware analysis program, when executed by a computer, performing determining whether communication by malware occurs when the malware is dynamically analyzed, suspending communication when the communication by the malware occurs to present a request to perform static analysis, and setting a device as a communication destination of the malware to make a response obtained by the static analysis as being expected by the malware.

(Supplementary note 4) The recording medium according to Supplementary note 3, when executed by a computer, the malware analysis program performing resuming the communication by the malware after the device as the communication destination of the malware is set to make the response expected by the malware.

(Supplementary note 5) The recording medium according to Supplementary note 3 or 4, when executed by a computer, the malware analysis program performing storing the response obtained by the static analysis as being expected by the malware in a response storing database.

What is claimed is:
1. A computer-implemented malware analysis method comprising:
   performing, by a malware analysis device communicating with a pseudo response server through an open flow switch controlled by an open flow controller, dynamic analysis of malware;
   determining, by the malware analysis device, whether communication by the malware occurs when performing the dynamic analysis;

suspending, by the malware analysis device, communication when determining that the communication by the malware occurs to present a request to perform static analysis; and setting, by the malware analysis device, the pseudo response server to make a response obtained by the static analysis as being expected by the malware; and transmitting, by the malware analysis device to the open flow controller, an instruction to update a flow table of the open flow switch so that a communication destination of the malware will become the pseudo response server.

2. The computer-implemented malware analysis method according to claim 1, further comprising:

resuming the communication by the malware after setting the pseudo response server as the communication destination of the malware to make the response expected by the malware.

3. A malware analysis device communicating with a pseudo response server through an open flow switch controlled by an open flow controller, the malware analysis device comprising:

a memory storing instructions; and
one or more hardware processors configured to execute the instructions to:
perform dynamic analysis of malware;
determine whether communication by the malware occurs when performing dynamic analysis;
suspend communication when determining that the communication by the malware occurs to present a request to perform static analysis;
set the pseudo response server to make a response obtained by the static analysis as being expected by the malware; and
transmitting, to the open flow controller, an instruction to update a flow table of the open flow switch so that a communication destination of the malware will become the pseudo response server.

4. The malware analysis device according to claim 3, wherein the one or more processors are further configured to execute the instructions to resume the communication by the malware after the pseudo response server as the communication destination of the malware is set to make the response expected by the malware.

5. A malware analysis system including a malware analysis device and a pseudo response server which transmits, to malware, a pseudo response as a response expected by the malware, wherein the malware analysis device comprises:
a memory storing instructions; and
one or more hardware processors configured to execute the instructions to:
perform dynamic analysis of the malware;
determine whether communication by the malware occurs when performing dynamic analysis;
suspend communication when determining that the communication by the malware occurs to present a request to perform static analysis; and
set the pseudo response server to make a response obtained by the static analysis as being expected by the malware,
wherein the malware analysis device is configured to communicate with the pseudo response server through an open flow switch controlled by an open flow controller, and
wherein the one or more processors are configured to execute the instructions to transmit, to the open flow controller, an instruction to update a flow table of the open flow switch so that a communication destination of the malware will become the pseudo response server.

6. The malware analysis system according to claim 5, wherein the one or more processors are further configured to execute the instructions to resume the communication by the malware after the pseudo response server is set to make the response expected by the malware.

* * * * *